United States Patent
Lee et al.

(10) Patent No.: US 10,933,263 B2
(45) Date of Patent: Mar. 2, 2021

(54) ENERGY STORAGE SYSTEM AND FIRE CONTROL METHOD OF THE ENERGY STORAGE SYSTEM

(71) Applicant: LG CHEM, LTD., Seoul (KR)

(72) Inventors: Ji-Won Lee, Daejeon (KR); Hyun-Min Lee, Daejeon (KR); Suk-Chul Kim, Daejeon (KR); Jun-Min Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 167 days.

(21) Appl. No.: 16/079,481

(22) PCT Filed: Aug. 29, 2017

(86) PCT No.: PCT/KR2017/009441
§ 371 (c)(1),
(2) Date: Aug. 23, 2018

(87) PCT Pub. No.: WO2018/056598
PCT Pub. Date: Mar. 29, 2018

(65) Prior Publication Data
US 2019/0046820 A1    Feb. 14, 2019

(30) Foreign Application Priority Data
Sep. 21, 2016 (KR) .................. 10-2016-0120936

(51) Int. Cl.
*A62C 3/16* (2006.01)
*A62C 35/68* (2006.01)
(Continued)

(52) U.S. Cl.
CPC ............... *A62C 3/16* (2013.01); *A62C 35/68* (2013.01); *A62C 37/38* (2013.01); *F24F 11/00* (2013.01);
(Continued)

(58) Field of Classification Search
CPC ........... A62C 3/16; A62C 37/38; A62C 36/68; G08B 19/00; F24F 11/33; F24F 11/34;
(Continued)

(56) References Cited

U.S. PATENT DOCUMENTS 3,990,518 A    11/1976  Hemme
4,227,577 A *  10/1980  Iida ........................ A62C 37/00
                                                                169/46
(Continued)

FOREIGN PATENT DOCUMENTS

JP    2009-10469 A    5/2009
JP    2013-54630 A    3/2013
(Continued)

OTHER PUBLICATIONS

International Search Report for PCT/KR2017/009441 dated Dec. 5, 2017.

*Primary Examiner* — Qingzhang Zhou
*Assistant Examiner* — Christopher R Dandridge
(74) *Attorney, Agent, or Firm* — Birch, Stewart, Kolasch & Birch, LLP (57) ABSTRACT

Provided are an energy storage system (ESS) capable of increasing precision of a fire control system to accurately determine and extinguish a fire, and a fire control method of the ESS. The ESS according to the present disclosure includes a container, a heating, ventilation and air conditioning (HVAC) system, and a fire control system, wherein the fire control system includes a fire extinguisher and a control panel, a smoke detector, a heat detector, and a flame detector mounted in the container, and a duct smoke detector mounted in a duct of the HVAC system, and wherein the control panel has a mode for operating the fire extinguisher when all of the smoke detector, the heat detector, and the flame detector detect a fire, a mode for operating the fire extinguisher when the duct smoke detector detects a fire, and (Continued)

a mode for operating the fire extinguisher when a manipulation button is operated.

16 Claims, 10 Drawing Sheets

(51) Int. Cl.
    *A62C 37/38*     (2006.01)
    *G08B 17/10*     (2006.01)
    *G08B 17/12*     (2006.01)
    *F24F 11/00*     (2018.01)
    *B65D 88/74*     (2006.01)
    *H01M 2/10*     (2006.01)
    *F24F 110/64*     (2018.01)

(52) U.S. Cl.
    CPC .......... *F24F 11/0001* (2013.01); *G08B 17/10* (2013.01); *G08B 17/12* (2013.01); *H01M 2/1077* (2013.01); *B65D 88/74* (2013.01); *F24F 2011/0002* (2013.01); *F24F 2110/64* (2018.01); *H01M 2220/10* (2013.01)

(58) Field of Classification Search
    CPC .. F24F 11/35; B60H 1/00278; H01M 2220/10
    USPC .............................. 454/256, 257; 429/100, 99
    See application file for complete search history.

(56) References Cited

U.S. PATENT DOCUMENTS

| | | | | |
|---|---|---|---|---|
| 5,486,811 A | * | 1/1996 | Wehrle | G08B 17/00 |
| | | | | 340/522 |
| 6,897,774 B2 | * | 5/2005 | Costa | G08B 17/10 |
| | | | | 340/522 |
| 7,433,794 B1 | * | 10/2008 | Berdichevsky | H01M 10/486 |
| | | | | 702/130 |
| 8,547,238 B2 | * | 10/2013 | Harchanko | G08B 29/188 |
| | | | | 340/578 |
| 8,859,127 B2 | * | 10/2014 | Han | H01M 10/6557 |
| | | | | 429/120 |
| 8,988,232 B1 | * | 3/2015 | Sloo | F24F 11/30 |
| | | | | 340/602 |
| 2005/0030172 A1 | | 2/2005 | Right et al. | |
| 2013/0082115 A1 | * | 4/2013 | May | F24F 13/1426 |
| | | | | 236/49.3 |

FOREIGN PATENT DOCUMENTS

| | | | | |
|---|---|---|---|---|
| KR | 10-1381592 B1 | | 4/2014 | |
| KR | 101550104 | * | 3/2015 | ............. H01M 2/10 |
| KR | 10-2015-0064962 A | | 6/2015 | |
| KR | 10-2015-0078643 A | | 7/2015 | |
| KR | 1020150007290 | * | 3/2016 | ............ H01M 10/63 |

* cited by examiner

FIG. 1

(RELATED ART)

FIG. 2

(RELATED ART)

ENERGY STORAGE SYSTEM AND FIRE CONTROL METHOD OF THE ENERGY STORAGE SYSTEM

TECHNICAL FIELD

The present disclosure relates to an energy storage system (ESS) and a fire control method of the ESS, and more particularly, to an ESS capable of increasing precision of a fire control system, and a fire control method of the ESS. The present application claims priority to Korean Patent Application No. 10-2016-0120936 filed on Sep. 21, 2016 in the Republic of Korea, the disclosure of which is incorporated herein by reference.

BACKGROUND ART

An energy storage system (ESS) refers to a device for storing electricity received from an external power source, e.g., a power plant, and transmitting the electricity to a desired place at a desired time. That is, the ESS is a high-capacity power storage device including power storage batteries, and is a device for storing electricity for use at desired place and a desired time. As such, the ESS currently attracts people's attention as a device for storing new and renewable energy (e.g., solar energy or wind energy).

Currently, the ESS uses lithium ion batteries. General storage batteries lose some of stored electricity due to self-discharge, but the lithium ion batteries do not. The lithium ion batteries have a high power storage capacity per unit volume, and are able to store even a small amount of electricity generated by a solar power generator of a house. Unlike the other storage batteries, the lithium ion batteries do not have 'the memory effect in which the capacity of the storage batteries is reduced if they are recharged when not fully discharged'. For this reason, the lithium ion batteries are used to store electricity.

In general, the ESS is configured by stacking battery modules each including lithium ion batteries, on one another in a container. A certain number of battery modules are stacked on one another in each of multilayered battery racks and are electrically connected to those of the other battery racks.

Figure 1:
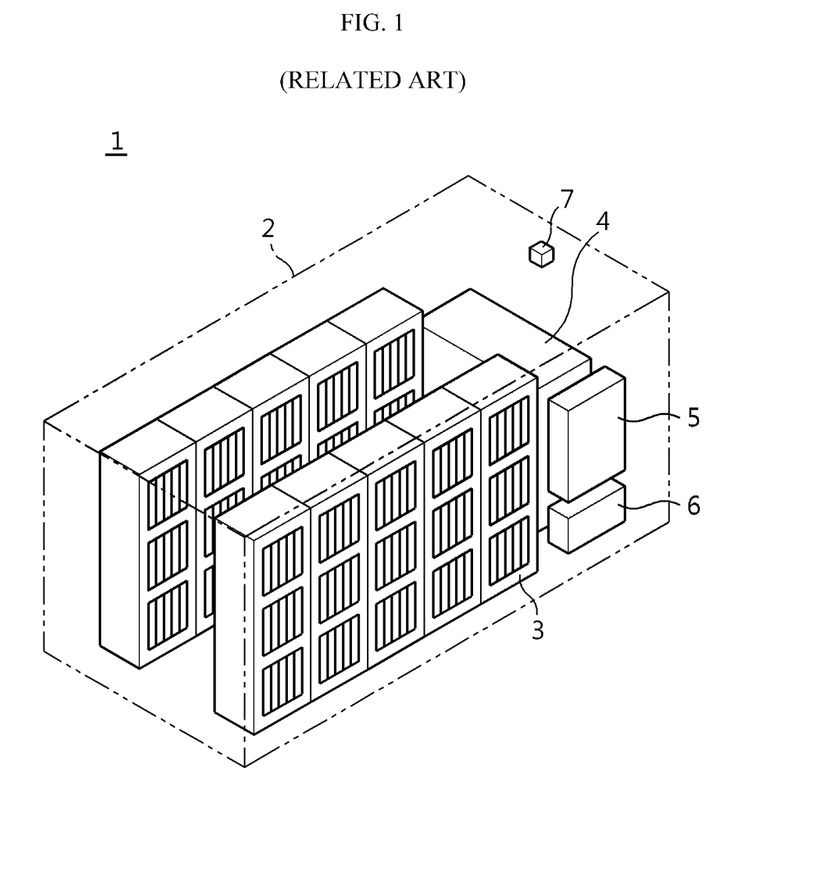
FIG. 1 is a schematic perspective view of a general energy storage system (ESS).
Figure 2:
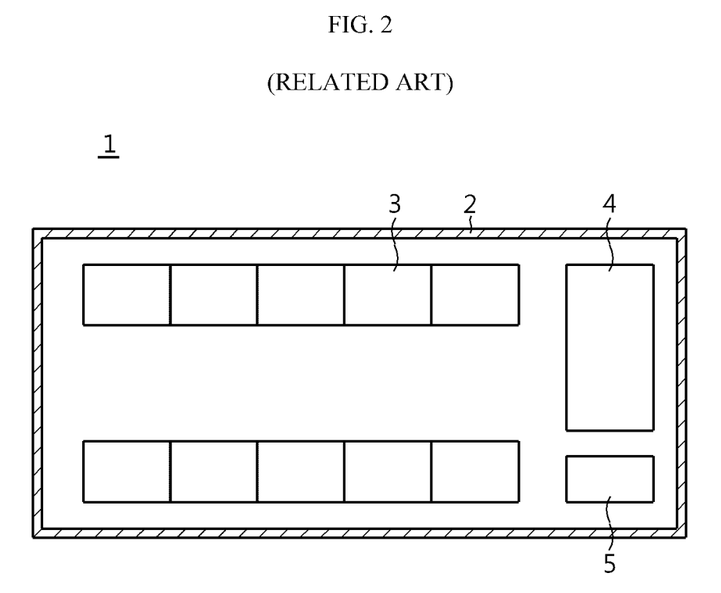
FIG. 2 is a horizontal cross-sectional view of the ESS of FIG. 1.

FIG. 1 is a schematic perspective view of a general ESS 1, and FIG. 2 is a horizontal cross-sectional view of the ESS 1 of FIG. 1.

Referring to FIGS. 1 and 2, the ESS 1 includes a container 2, battery racks 3, a cooling member 4, etc.

A plurality of battery racks 3 are located in the container 2. The plurality of battery racks 3 are adjacent to a side wall and an opposite side wall of the container 2 and are aligned along a length direction of the side walls. The cooling member 4 for cooling heat generated from the battery racks 3 is also located in the container 2.

Since a large number of battery modules are connected to each other and are densely included in the ESS 1, a huge amount of heat is generated. To solve this problem, the cooling member 4 is essential.

Furthermore, since a fire which occurs in a worse case may lead to a big accident, a fire control system for controlling a fire is also necessary. In this regard, conventionally, a fire extinguisher 5, a control panel 6, and a smoke detector 7 are provided in the container 2.

To control a fire, the fire extinguisher 5 may be mechanically or manually used, or it may be determined whether a fire occurs, using only the smoke detector 7, and the fire extinguisher 5 may be driven through the control panel 6. The fire extinguisher 5 uses a carbon dioxide gas to extinguish the fire.

However, since only the smoke detector 7 is used to determine whether a fire occurs, smoke unrelated to a fire, for example, smoke generated due to a temperature difference between the inside and the outside of the cooling member 4, water vapor, or external sand dust, may be recognized as a fire to incorrectly operate the fire extinguisher 5. If an extinguishing gas is discharged when a fire has not occurred, all internal elements of the container 2, e.g., a battery and a computer (not shown), become unusable.

Therefore, to solve the above problem, reliability and accuracy of operation of a fire extinguisher in an ESS should be increased and thus precision of a fire control system should also be increased.

DISCLOSURE

Technical Problem

The present disclosure is designed to solve the problems of the related art, and therefore the present disclosure is directed to providing an energy storage system (ESS) capable of increasing precision of a fire control system to accurately determining and extinguishing a fire, and a fire control method of the ESS.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an energy storage system (ESS) including a container having an accommodation space therein, a heating, ventilation and air conditioning (HVAC) system configured to condition internal air of the container, to adjust an internal temperature of the container, and to adjust natural wind flowing into the container, and a fire control system provided in the container, wherein the fire control system includes a fire extinguisher and a control panel located in the accommodation space, a smoke detector, a heat detector, and a flame detector mounted in the container, and a duct smoke detector mounted in a duct of the HVAC system, and wherein the control panel has a mode for operating the fire extinguisher when all of the smoke detector, the heat detector, and the flame detector detect a fire, a mode for operating the fire extinguisher when the duct smoke detector detects a fire, and a mode for operating the fire extinguisher when a manipulation button is operated.

The fire extinguisher may be a valve-type extinguishing gas sprayer.

The duct smoke detector may be mounted in at least one of an inlet duct and an outlet duct of the HVAC system.

In an embodiment, a first region and a second region may be set to divide the accommodation space into two, and a smoke detector, a heat detector, and a flame detector may be mounted in each region. In this case, the smoke detector and the heat detector may be mounted on a top wall (ceiling) of the container corresponding to an almost center part of each region, and the flame detector may be mounted on the top wall of the container near two facing side walls of the container.

In the above-described configuration, the control panel may operate the fire extinguisher when all of three types of the detectors mounted in the same region detect a fire, or when all of different types of the detectors mounted in different regions detect a fire. The control panel may not operate the fire extinguisher but issue a fire alarm when all of the same type of the detectors mounted in different regions detect a fire.

In another embodiment, the ESS may further include battery racks located in the accommodation space and including a first battery rack group and a second battery rack group spaced apart from each other to face each other with respect to a center of the accommodation space, the HVAC system may include an upper duct located on the accommodation space to supply a cooling fluid to a cooling space corresponding to a space between the first and second battery rack groups, a cooling unit located outside the accommodation space to cool the cooling fluid, and a fluid channel member having a passage space where the cooling fluid heated after cooling the battery racks moves to the cooling unit, the cooling unit may cool the heated cooling fluid received from the passage space, and then supply the cooled cooling fluid to the upper duct, and the duct smoke detector may be mounted in at least one of the upper duct and the fluid channel member.

In this case, the container may include a first side wall, a second side wall located perpendicular to the first side wall, a third side wall facing the first side wall and located perpendicular to the second side wall, and a fourth side wall facing the second side wall and located perpendicular to the first and third side walls, and a plurality of cooling units may be provided outside the first and third side walls.

In the above-described configuration, the fluid channel member may include a partition located on the first and second battery rack groups, a pair of blocking plates configured to block a space between an outermost battery rack of the first or second battery rack group and the second or fourth side wall, and a pair of inner ducts configured to provide the passage space between the cooling unit and the second side wall or between the second side wall and the first or second battery rack group, and the duct smoke detector may be mounted in the inner ducts.

A door generated on the second or fourth side wall and located adjacent to the first or third side wall may be provided on the container, and the inner ducts may be located at a higher height compared to a top surface of the door.

The upper duct may include a first horizontal part located adjacent to the first side wall, a second horizontal part located adjacent to the third side wall in parallel with the first horizontal part, and a center part combined perpendicular to centers of the first and second horizontal parts, and the duct smoke detector may be mounted in the center part.

According to an embodiment, the first horizontal part, the second horizontal part, and the center part may be combined with each other to form an I shape when viewed from above.

According to an embodiment, the battery racks of the first battery rack group may be spaced apart from the second side wall by a certain distance and aligned along a first direction, and the battery racks of the second battery rack group may be spaced apart from the fourth side wall by a certain distance and aligned along the first direction, the upper duct may include a supplier configured to supply the cooling fluid into the accommodation space and located on the center part, the supplier may include an opening through which the cooling fluid flowing in the upper duct passes, a plurality of guide plates aligned in a center region of the opening, spaced apart from each other along the first direction, and provided in a rotatable form, and a guide plate controller configured to control the guide plates, and the duct smoke detector may be mounted on the supplier.

According to an embodiment, a plurality of suppliers may be located on a bottom surface of the center part, and the plurality of suppliers may be spaced apart from each other by a certain distance along the first direction.

According to an embodiment, the guide plate controller may control the guide plates to adjust a direction of supplying the cooling fluid into the cooling space through the opening.

In another aspect of the present disclosure, there is also provided a fire control method of an energy storage system (ESS) including a container having an accommodation space therein, a heating, ventilation and air conditioning (HVAC) system, and a fire extinguisher, the method including mounting a smoke detector, a heat detector, and a flame detector in the container, mounting a duct smoke detector in a duct of the HVAC system, and operating the fire extinguisher when all of the smoke detector, the heat detector, and the flame detector detect a fire, when the duct smoke detector detects a fire, or when a manipulation button is operated.

Particularly, a first region and a second region may be set to divide the accommodation space into two, and a smoke detector, a heat detector, and a flame detector may be mounted in each region.

The fire extinguisher is operated when all of three types of the detectors mounted in the same region detect a fire, or when all of different types of the detectors mounted in different regions detect a fire.

The fire extinguisher may not be operated but a fire alarm may be issued when all of the same type of the detectors mounted in different regions detect a fire.

Advantageous Effects

According to the present disclosure, since three different types of fire detectors are used, a cause of a fire may be clearly identified. By further detecting smoke introduced through a duct of a heating, ventilation and air conditioning (HVAC) system, a fire alarm may be accurately issued and a fire extinguisher may be accurately operated, thereby increasing reliability and accuracy of diagnosing a fire. In addition, by breaking down levels of the fire alarm in detail, evacuation and behavior rules for each level of the fire alarm may be specifically defined.

Particularly, in an energy storage system (ESS) according to an embodiment of the present disclosure, since cooling units are provided outside a space where battery racks are accommodated, the number of battery racks located in a container may be maximized and thus an energy density of the ESS may be increased. Furthermore, since a space for cooling the battery racks is separate from a space where a heated cooling fluid moves, efficiency of cooling the battery racks may be increased. In addition, by mounting a duct smoke detector at various locations, when a fire occurs, reliability and accuracy of diagnosing the fire and discharging an extinguishing gas may be increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 3:
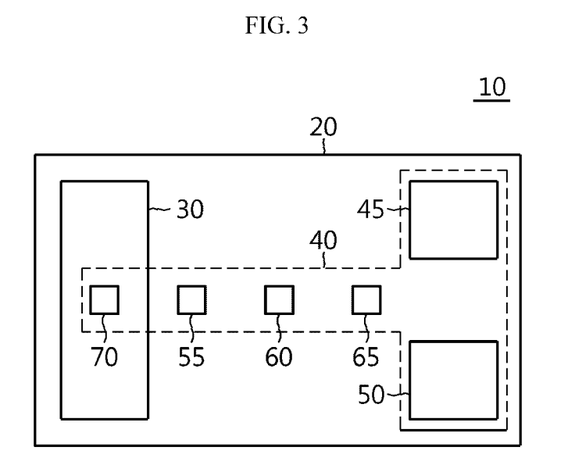
FIG. 3 is a schematic block diagram of an ESS according to an embodiment of the present disclosure.
Figure 4:
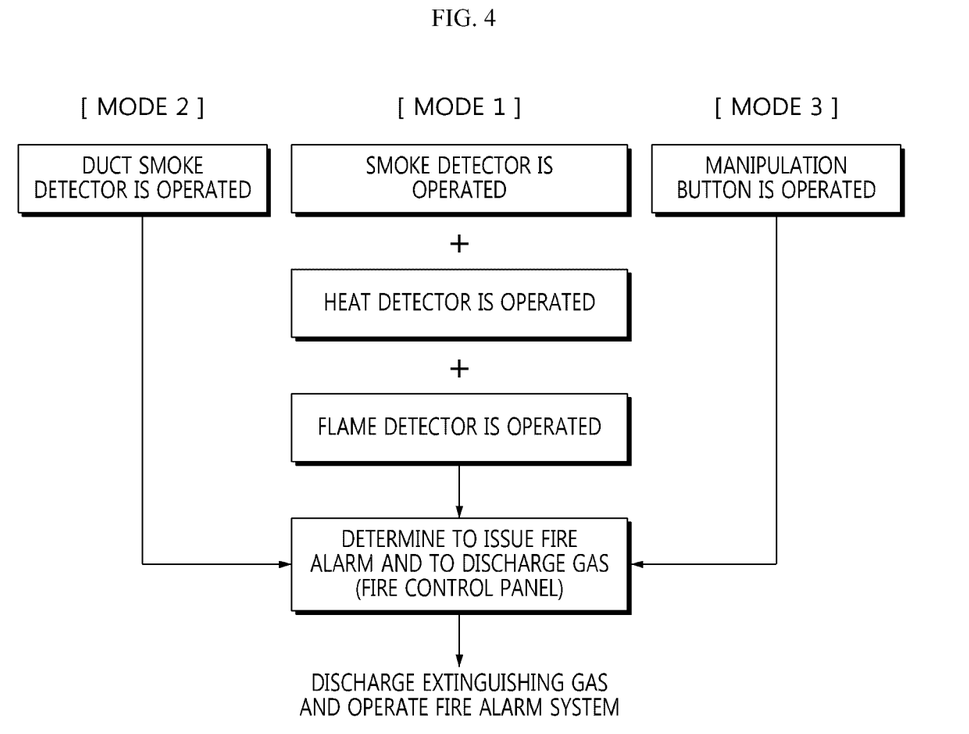
FIG. 4 is a schematic block diagram for describing a fire control method of the ESS illustrated in FIG. 3.

FIG. 3 is a schematic block diagram of an energy storage system (ESS) 10 according to an embodiment of the present disclosure. FIG. 4 is a schematic block diagram for describing a fire control method of the ESS 10 illustrated in FIG. 3.

Referring to FIG. 3, the ESS 10 includes a container 20 having an accommodation space therein, a heating, ventilation and air conditioning (HVAC) system 30 configured to condition internal air of the container 20, to adjust an internal temperature of the container 20, and to adjust natural wind flowing into the container 20, and a fire control system 40 provided in the container 20.

The fire control system 40 includes a fire extinguisher 45 and a control panel 50 located in the accommodation space, a smoke detector 55, a heat detector 60, and a flame detector 65 mounted in the container 20, and a duct smoke detector 70 mounted in a duct of the HVAC system 30.

As shown in FIG. 4, the control panel 50 has a mode for operating the fire extinguisher 45 when all of the smoke detector 55, the heat detector 60, and the flame detector 65 detect a fire (mode 1), a mode for operating the fire extinguisher 45 when the duct smoke detector 70 detects a fire (mode 2), and a mode for operating the fire extinguisher 45 when a manipulation button is operated (mode 3).

The smoke detector 55 is a device for detecting smoke generated due to combustion before heat is generated by a fire, and an ionization smoke detector and a photoelectric smoke detector may be used. The smoke detector 55 is appropriate for an enclosed place where incomplete combustion easily occurs, e.g., the container 20, or a place which requires rapid direction, e.g., a place related to electricity.

The heat detector 60 is operated when an ambient temperature is increased above a set reference temperature, and is divided into a rate-of-rise heat detector and a fixed-temperature heat detector. The rate-of-rise heat detector detects a rapid increase of the ambient temperature compared to a general temperature increase, and may use expansion of air and a variation in electrical resistance due to a temperature increase. The fixed-temperature heat detector is operated when the ambient temperature reaches a certain temperature, and may use a bimetal and a variation in thermal resistance. In the present disclosure, the heat detector 60 is used a lot to solve problems caused by malfunction of the smoke detector 55.

The flame detector 65 includes an infrared (IR) spot flame detector for detecting IR light emitted from a flame of a fire, and an ultraviolet (UV) spot flame detector for detecting UV light emitted therefrom. In addition, a UV/IR spot flame detector may be used. The flame detector 65 changes energy of a specific wavelength (IR, UV) emitted from the flame, into electrical energy and detects the electrical energy using a phenomenon that, when a material absorbs light, the material emits photoelectrons and thus electromotive force is generated. In the present disclosure, the flame detector 65 as well as the heat detector 60 are used a lot to solve problems caused by malfunction of the smoke detector 55.

The fire extinguisher 45 may be a valve-type extinguishing gas sprayer.

The duct smoke detector 70 may be mounted in at least one of an inlet duct and an outlet duct of the HVAC system 30.

As described above, the ESS 10 includes the smoke detector 55, the heat detector 60, and the flame detector 65 connected in series, and is designed to discharge an extinguishing gas upon determining a fire when three types of fire alarms are input.

In addition, by mounting the duct smoke detector 70 in the duct of the HVAC system 30, smoke introduced through the duct may be detected and diagnosed as a fire to issue a fire alarm and discharge an extinguishing gas.

Conventionally, since only a smoke detector mounted on a top wall of a container is used, a fire may not be accurately diagnosed. However, according to the configuration of the present disclosure, when a fire occurs, reliability and accuracy of diagnosing a fire and discharging an extinguishing gas may be increased. Since three different types of fire detectors are used, a cause of a fire may be clearly identified. By further detecting smoke introduced through a duct, a fire alarm may be accurately issued and the fire extinguisher 45 may be accurately operated.

Figure 5:
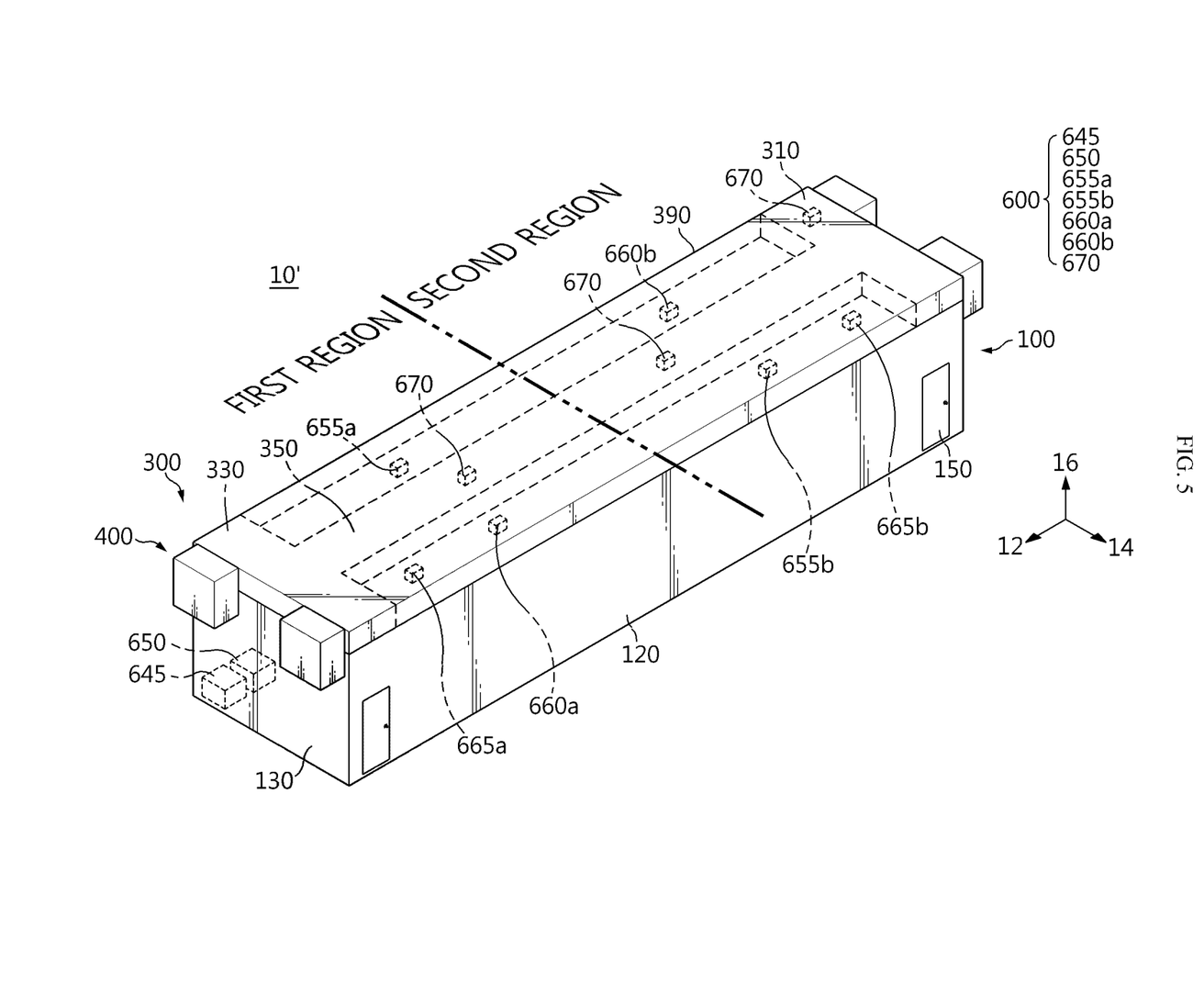
FIG. 5 is a perspective view of an ESS according to another embodiment of the present disclosure.
Figure 6:
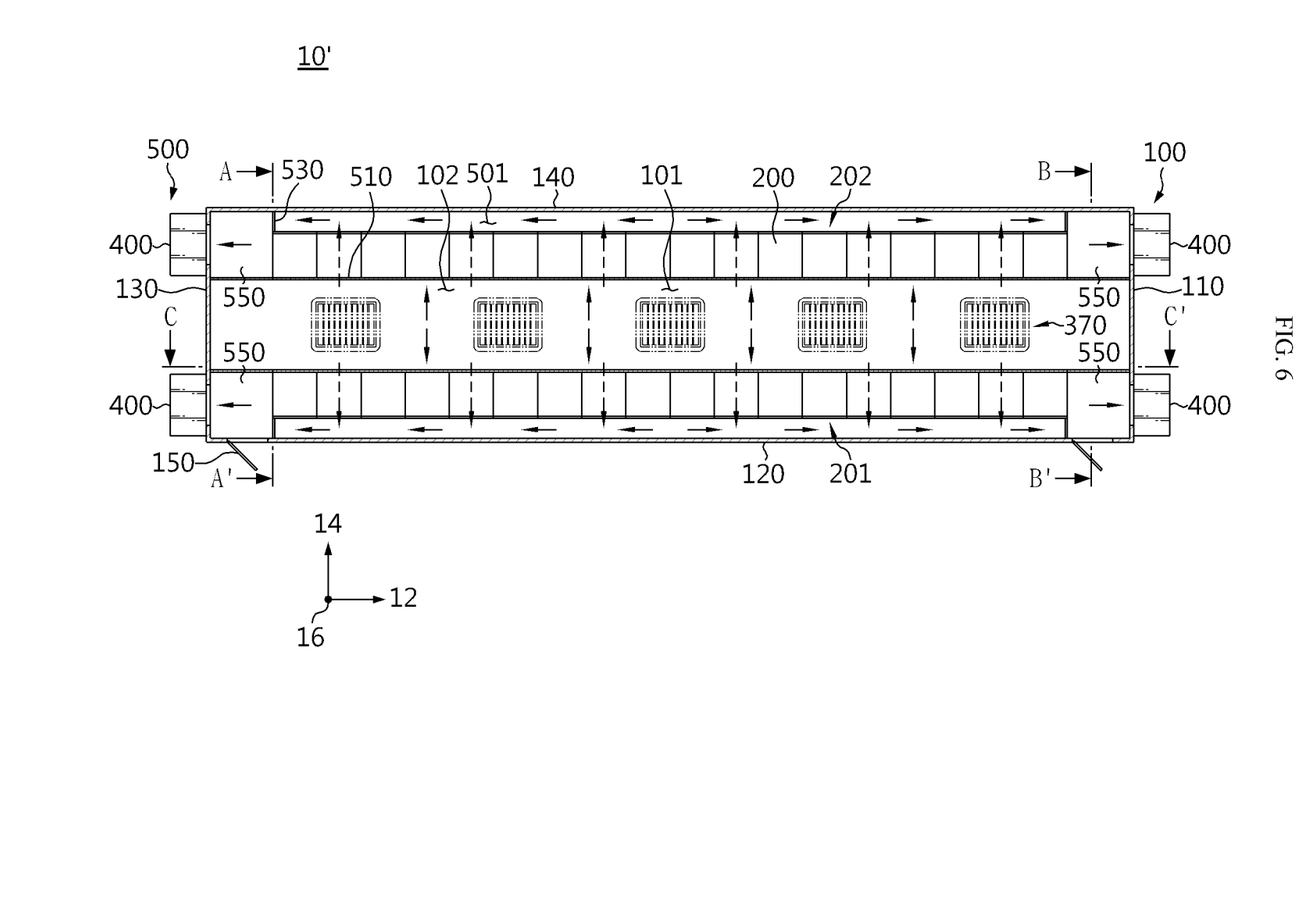
FIG. 6 is a horizontal cross-sectional view of the ESS of FIG. 5.

FIG. 5 is a perspective view of an ESS 10' according to another embodiment of the present disclosure, and FIG. 6 is a horizontal cross-sectional view of the ESS 10' of FIG. 5.

Referring to FIGS. 5 and 6, the ESS 10' includes a container 100, battery racks 200, an upper duct 300, cooling units 400, and fluid channel members 500. The upper duct 300, the cooling units 400, and the fluid channel members 500 correspond to the HVAC system 30 described above in relation to FIG. 3. The ESS 10' further includes a fire control system 600. The fire control system 600 includes a fire extinguisher 645 and a control panel 650 located in an accommodation space, smoke detectors 655a and 655b, heat detectors 660a and 660b, and flame detectors 665a and 665b mounted in the container 100, and a duct smoke detector 670 mounted in the upper duct 300. The fire extinguisher 645 may be provided on a side wall or a top wall inside the container 100. The fire extinguisher 645 may be provided to extinguish a fire when the fire occurs in the container 100. The fire extinguisher 645 may be a valve-type extinguishing gas sprayer.

The container 100 has an accommodation space 101 therein. A plurality of battery racks 200 and the fluid channel members 500 are located in the accommodation space 101. The container 100 of the ESS 10' has an almost rectangular box shape. The container 100 has a first side wall 110, a second side wall 120, a third side wall 130, and a fourth side wall 140.

Herein, a length direction of the second side wall 120 is referred to as a first direction 12. When viewed from above, a direction perpendicular to the first direction 12 is referred to as a second direction 14. A direction perpendicular to both of the first and second directions 12 and 14 is referred to as a third direction 16.

The first and third side walls 110 and 130 are spaced apart from each other by a certain distance along the first direction 12. The second and fourth side walls 120 and 140 are spaced apart from each other by a certain distance along the second direction 14.

The second side wall 120 is located perpendicular to the first side wall 110. The second side wall 120 may extend longer than the first side wall 110. The third side wall 130 faces and is located in parallel with the first side wall 110. The third side wall 130 is located perpendicular to the second side wall 120. The fourth side wall 140 faces and is located in parallel with the second side wall 120. The fourth side wall 140 is located perpendicular to both of the first and third side walls 110 and 130.

The first side wall 110, the second side wall 120, the third side wall 130, and the fourth side wall 140 may have lengths based on a container size. For example, in a 40 FT container, the length of the second and fourth side walls 120 and 140 (i.e., a container length) is 12.02 M, and the length of the first and third side walls 110 and 130 (i.e., a container width) is 2.34 M. A height of the container 100 is 2.38 M.

Doors 150 may be provided on the second side wall 120. A plurality of doors 150 may be provided. For example, two doors 150 may be provided. One of the two doors 150 may be located adjacent to the first side wall 110, and the other one may be located adjacent to the third side wall 130. The battery racks 200 may be aligned along the first direction 12 at an inner side of the second side wall 120 facing a space between the two doors 150.

Although the doors 150 are provided on the second side wall 120 in an embodiment of the present disclosure, the doors 150 are not limited thereto and may be provided on the fourth side wall 140. Optionally, the doors 150 may be provided on both of the second and fourth side walls 120 and 140.

The battery racks 200 are located in the accommodation space 101. A plurality of battery racks 200 are provided. The battery racks 200 include a first battery rack group 201 and a second battery rack group 202.

The first and second battery rack groups 201 and 202 are located to face each other with respect to a center of the accommodation space 101. The first and second battery rack groups 201 and 202 are spaced apart from each other along the second direction 14. The first battery rack group 201 is spaced apart from the second side wall 120 by a certain distance. The battery racks 200 of the first battery rack group 201 are aligned along the first direction 12.

The second battery rack group 202 is spaced apart from the fourth side wall 140 by a certain distance. The battery racks 200 of the second battery rack group 202 are aligned along the first direction 12.

Although each of the first and second battery rack groups 201 and 202 includes eighteen battery racks 200 in an embodiment of the present disclosure, the number of battery racks 200 is not limited thereto.

The first and second battery rack groups 201 and 202 are located in a cooling space 102 of the accommodation space 101.

Herein, the cooling space 102 is defined as a space of the accommodation space 101 between the first and second battery rack groups 201 and 202 including a space where the first and second battery rack groups 201 and 202 are placed. A passage space 501 is defined as a space including a space between the first battery rack group 201 and the second side wall 120, a space between the second battery rack group 202 and the fourth side wall 140, and spaces between inner ducts 550 of the fluid channel members 500, which will be described below. That is, the passage space 501 is defined as a space where the fluid channel members 500 to be described below are provided.

Each battery rack 200 has a plurality of battery modules. Each battery module may include a plurality of lithium ion batteries. Each battery rack 200 may include a rack housing, the battery modules, cooling fans, a battery controller, etc.

The plurality of battery modules may be stacked on one another along the third direction 16. The cooling fans may adjust the flow of a cooling fluid in such a manner that the cooling fluid supplied to the cooling space 102 passes through the battery racks 200. A plurality of cooling fans may be stacked on one another along the third direction 16. The battery controller charges/discharges and protects the battery modules. The battery controller may control operation of the cooling fans.

In the ESS 10', a first region and a second region are set to divide the accommodation space 101 into two, and a smoke detector, a heat detector, and a flame detector are mounted in each region. In the current embodiment, the smoke detector 655a, the heat detector 660a, and the flame detector 665a are mounted in the first region, and the smoke detector 655b, the heat detector 660b, and the flame detector 665b are mounted in the second region. Since the smoke detector, the heat detector, and the flame detector have fixed coverage areas depending on sizes thereof, the coverage areas are considered to mount the smoke detector, the heat detector, and the flame detector.

Like the 40 FT container mentioned above, the container 100 extends along the first direction 12. To appropriately control a fire in the accommodation space 101 of the container 100, as illustrated in FIG. 5, the accommodation space 101 may be divided into two along the second direction 14.

The smoke detectors 655a and 655b and the heat detectors 660a and 660b may be mounted on the top wall of the container 100 corresponding to an almost center part of each region, and the flame detectors 665a and 665b may be mounted on the top wall of the container 100 near two facing side walls of the container 100, e.g., the first and third side walls 110 and 130 in the current embodiment. The locations of the detectors are determined to the most effectively diagnose and control a fire in consideration of the shape of the container 100, and the detectors are symmetrically mounted in the first and second regions as long as possible.

In the above-described configuration, the control panel 650 may operate the fire extinguisher 645 when all of three types of the detectors mounted in the same region detect a fire, or when all of different types of the detectors mounted in different regions detect a fire. For example, the control panel 650 operates the fire extinguisher 645 when all of the smoke detector 655a, the heat detector 660a, and the flame detector 665a mounted in the first region detect a fire. The control panel 650 also operates the fire extinguisher 645 when all of the smoke detector 655b, the heat detector 660b, and the flame detector 665b mounted in the second region detect a fire. For instance, the control panel 650 also operates the fire extinguisher 645 when all of the smoke detector 655a and the heat detector 660a mounted in the first region and the flame detector 665b mounted in the second region detect a fire. As another example, the control panel 650 also operates the fire extinguisher 645 when all of the smoke detector 655a mounted in the first region and the heat detector 660b and the flame detector 665b mounted in the second region detect a fire. In addition, various combinations of the above-described examples are also possible.

The control panel 650 may not operate the fire extinguisher 645 but issue a fire alarm when all of the same type of the detectors mounted in different regions detect a fire. For example, when both of the smoke detectors 655a and 655b detect a fire, when both of the heat detectors 660a and 660b detect a fire, and when both of the flame detectors 665a and 665b detect a fire, the control panel 650 may not operate the fire extinguisher 645 but issue a fire alarm. When three types of the detectors are mounted but only a single type of the detectors diagnose a fire, a possibility of a fire is low. Therefore, instead of immediately operating the fire extinguisher 645, a fire alarm may be issued such that a user may be prepared for a fire to occur later.

According to the above-described configuration, when a fire occurs, reliability and accuracy of diagnosing a fire and discharging an extinguishing gas may be increased. Since three different types of fire detectors are used, a cause of a fire may be clearly identified. By further detecting smoke introduced through a duct, a fire alarm may be accurately issued and the fire extinguisher 645 may be accurately operated. In addition, by breaking down levels of the fire alarm in detail, evacuation and behavior rules for each level of the fire alarm may be specifically defined.

Figure 10:
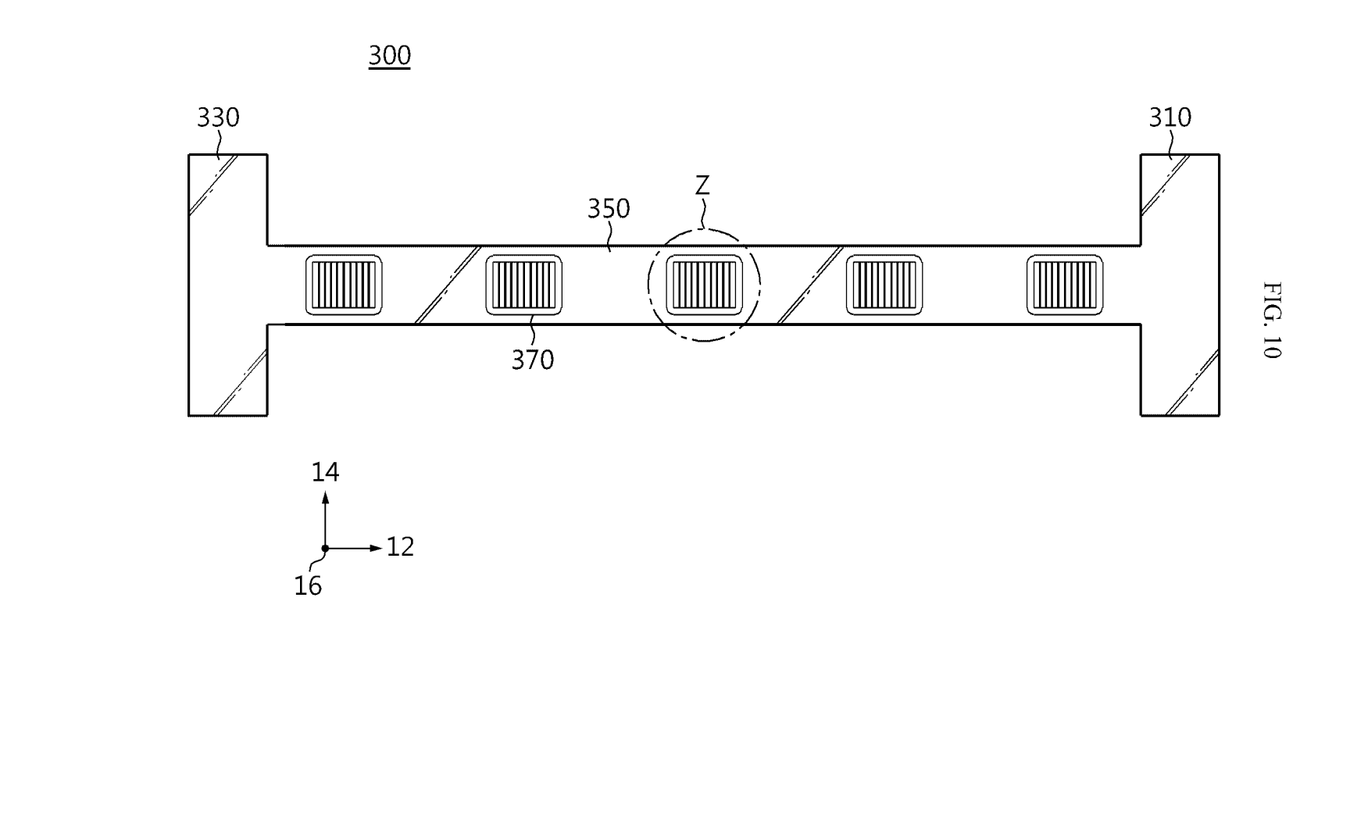
FIG. 10 is a rear view of an upper duct of FIG. 5.
Figure 11:
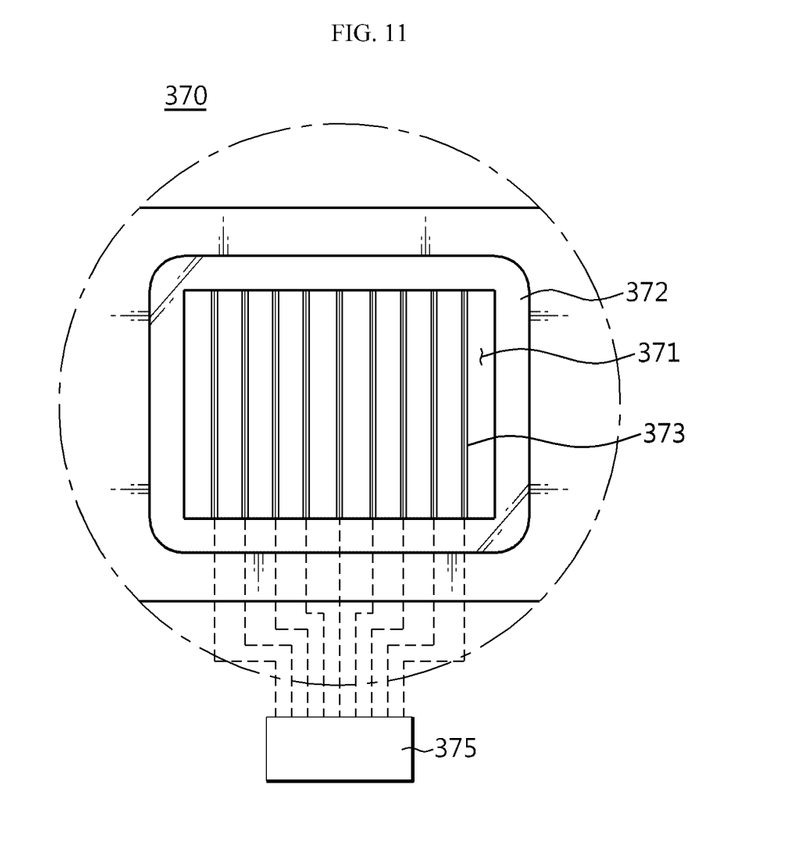
FIG. 11 is a magnified view of a portion Z of FIG. 10.

FIG. 10 is a rear view of the upper duct 300 of FIG. 5, and FIG. 11 is a magnified view of a portion Z of FIG. 10.

Referring to FIGS. 5, 10, and 11, the upper duct 300 supplies a cooling fluid to the accommodation space 101. The upper duct 300 is located on the container 100. The upper duct 300 is connected to a plurality of cooling units 400 to be described below. A space where the cooling fluid supplied from the cooling units 400 flows is provided in the upper duct 300. The upper duct 300 includes a cover 390, a first horizontal part 310, a second horizontal part 330, a center part 350, and suppliers 370.

The duct smoke detector 670 may be mounted in the center part 350, and more particularly, on the suppliers 370. The duct smoke detector 670 may be provided as a rod-shaped detector mounted perpendicular to a flowing direction of the fluid in the duct to detect smoke included in the fluid.

The cover 390 has an internal space. The cover 390 has an almost rectangular box shape. The cover 390 is located on the container 100. The cover 390 has a shape similar to the container 100, and has a lower height of the third direction 16 compared to the container 100. The first horizontal part 310, the second horizontal part 330, and the center part 350 are located in the internal space of the cover 390.

The first horizontal part 310, the second horizontal part 330, and the center part 350 are connected to each other, and the cooling fluid flows in internal spaces thereof. The first horizontal part 310, the second horizontal part 330, and the center part 350 are combined with each other to form a Roman character I shape when viewed from above. The first horizontal part 310 is located adjacent to the first side wall 110. The first horizontal part 310 has a length direction along the second direction 14. The second horizontal part 330 is located adjacent to the third side wall 130. The second horizontal part 330 is located in parallel with the first horizontal part 310. The second horizontal part 330 has a length direction along the second direction 14.

The center part 350 is combined perpendicular to centers of the first and second horizontal parts 310 and 330. The center part 350 has a length direction along the first direction 12.

The suppliers 370 are located on a bottom surface of the upper duct 300. The suppliers 370 are located on the center part 350. The cooling fluid flowing in the center part 350 may pass through the suppliers 370. The suppliers 370 supply the cooling fluid to the accommodation space 101. A plurality of suppliers 370 are provided. The plurality of suppliers 370 are located on the bottom surface of the center part 350. The plurality of suppliers 370 are spaced apart from each other by a certain distance along the first direction 12.

Each supplier 370 includes a frame 372, an opening 371, guide plates 373, and a guide plate controller 375.

The frame 372 has an empty space at a center thereof. The frame 372 has a rectangular shape.

The cooling fluid flowing in the upper duct 300 may pass through the opening 371. The frame 372 is mounted on the opening 371. The opening 371 has a rectangular shape.

The guide plates 373 are arranged in a center region of the opening 371. The guide plates 373 may be provided as thin plates. A plurality of guide plates 373 are provided. The plurality of guide plates 373 are aligned and are spaced apart from each other along the first direction 12. The guide plates 373 may be provided in a rotatable form.

The guide plate controller 375 adjusts rotation angles of the guide plates 373. The guide plate controller 375 controls the rotation angles of the guide plates 373 in such a manner that the cooling fluid passing through the suppliers 370 is supplied along the first direction 12 of the cooling space 102.

The cooling fluid supplied to the cooling space 102 is not directly supplied to the battery racks 200 through the suppliers 370. Since the cooling fluid is not directly supplied to the battery racks 200 as described above, the cooling fluid may be prevented from swirling after hitting the battery racks 200. Furthermore, based on the above-described configuration, the cooling fluid is supplied from an upper part to a lower part of a space between the first and second battery rack groups 201 and 202, passes through the battery racks 200 to cool the battery racks 200, and then exits through cooling fans, thereby stably cooling the battery racks 200. In addition, the cooling fluid may be prevented from being supplied from the suppliers 370 directly to the battery racks 200 and from being concentrated on only upper parts of the battery racks 200.

The cooling units 400 are located outside the accommodation space 101. The cooling units 400 may cool the heated cooling fluid. The cooling units 400 supply the cooled cooling fluid to the upper duct 300. The cooling units 400 may cool the cooling fluid received from the passage space 501 to be described below.

A plurality of cooling units 400 are provided. According to an embodiment, four cooling units 400 may be provided. Two cooling units 400 may be mounted on the first side wall 110. The two cooling units 400 are spaced apart from each other by a certain distance along the second direction 14. The two cooling units 400 are connected to the first horizontal part 310, and may supply the cooling fluid to the first horizontal part 310.

The other two cooling units 400 may be mounted on the third side wall 130. The two cooling units 400 are spaced apart from each other by a certain distance along the second direction 14. The two cooling units 400 are connected to the second horizontal part 330, and may supply the cooling fluid to the second horizontal part 330.

The duct smoke detector 670 may also be mounted in the first horizontal part 310 and/or the second horizontal part 330 connected to the cooling units 400.

Each cooling unit 400 may have a suction part. The suction part may suck out the cooling fluid of the passage space 501. According to an embodiment, the cooling unit 400 may be provided as (an outdoor unit of) an air conditioner including a suction part. Unlike this, the cooling unit 400 may be provided as a device capable of cooling the cooling fluid.

In the conventional technology described above in relation to FIGS. 1 and 2, the cooling member 4 is located in the container 2 and thus the number of battery racks 3 providable in the container 2 is limited. The limitation on the number of battery racks 3 reduces an energy density of the ESS 1. On the other hand, in an embodiment of the present disclosure, the cooling units 400 are located outside the container 100 and thus a larger internal space for accommodating the battery racks 200 may be ensured. Since the cooling units 400 are located outside, a larger number of battery racks 200 may be placed in the container 100. As such, an energy density of the ESS 10' may be increased.

According to an embodiment of the present disclosure, the energy density may be increased by setting a ratio of an area occupied by the battery racks 200 to a cross-sectional area of the container 100 to be equal to or greater than ⅔. Herein, the areas occupied by the container 100 and the battery racks 200 refer to those based on a horizontal cross-sectional view of the ESS 10' as illustrated in FIG. 6.

Figure 7:
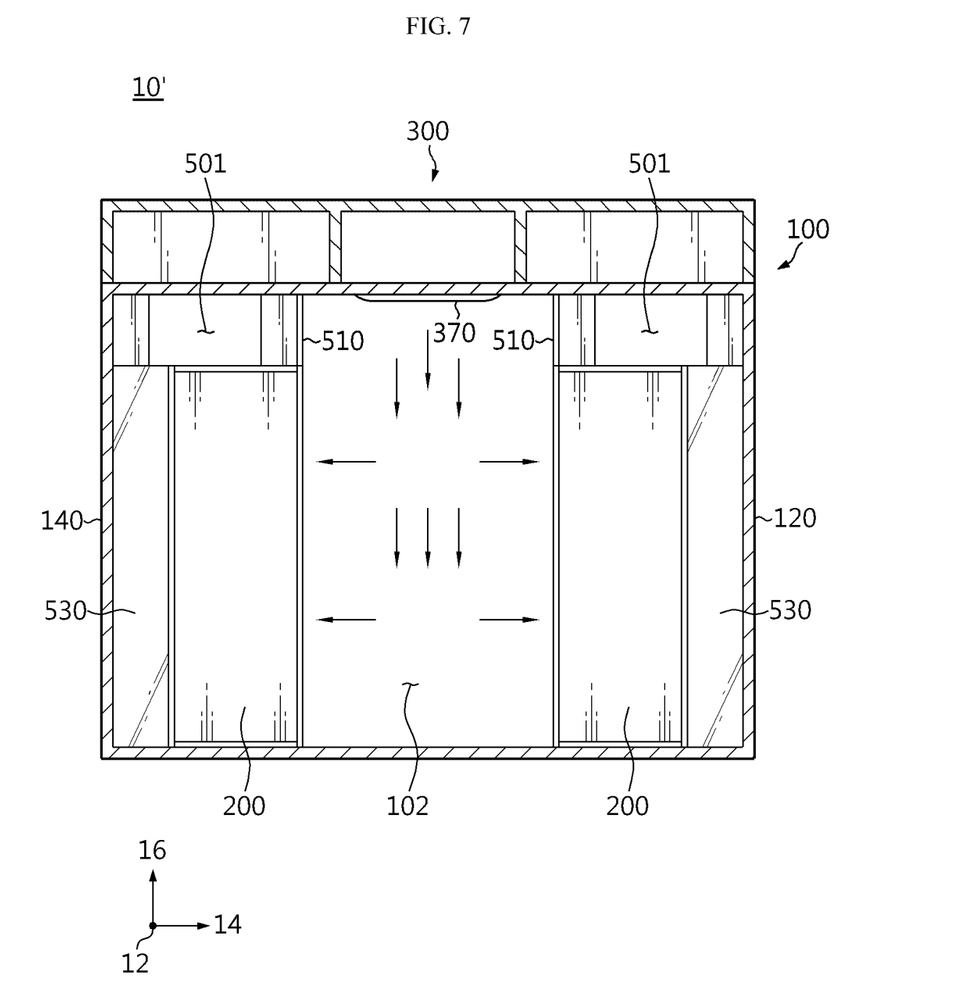
FIG. 7 is a vertical cross-sectional view of the ESS of FIG. 6, taken along a line A-A.
Figure 8:
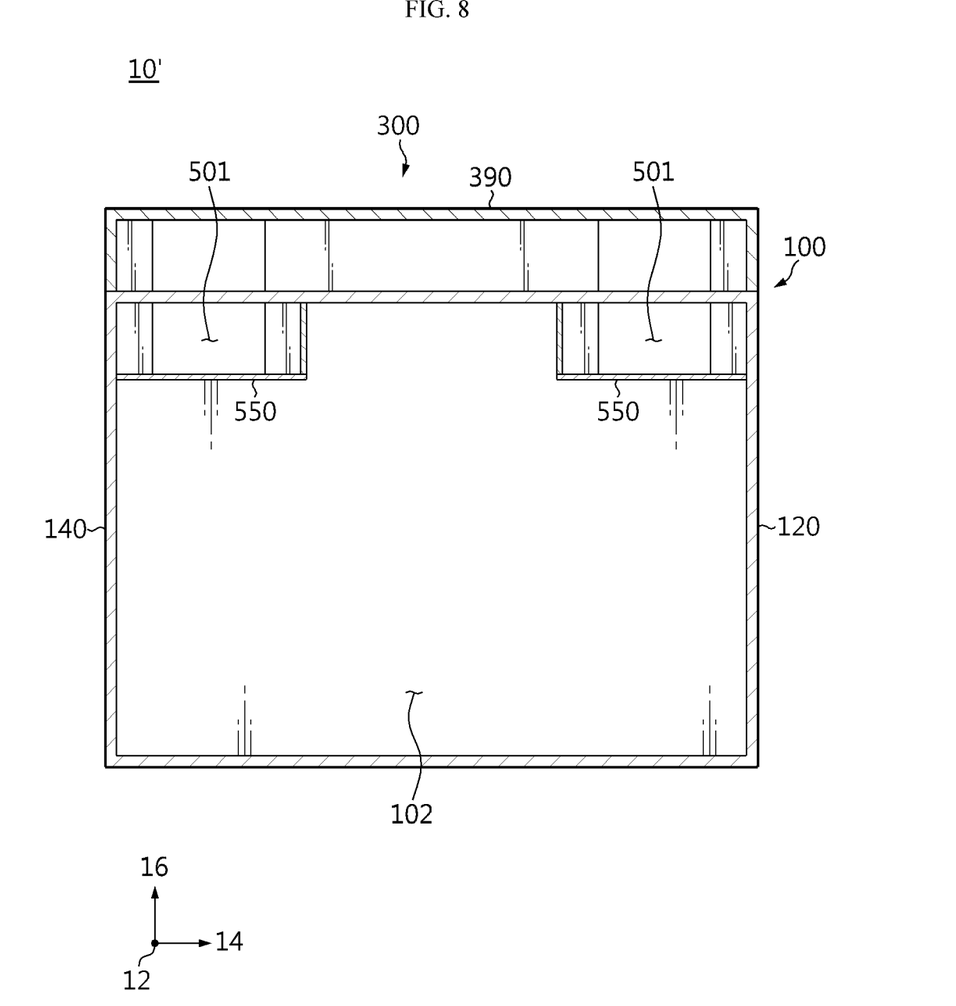
FIG. 8 is a vertical cross-sectional view of the ESS of FIG. 6, taken along a line B-B.
Figure 9:
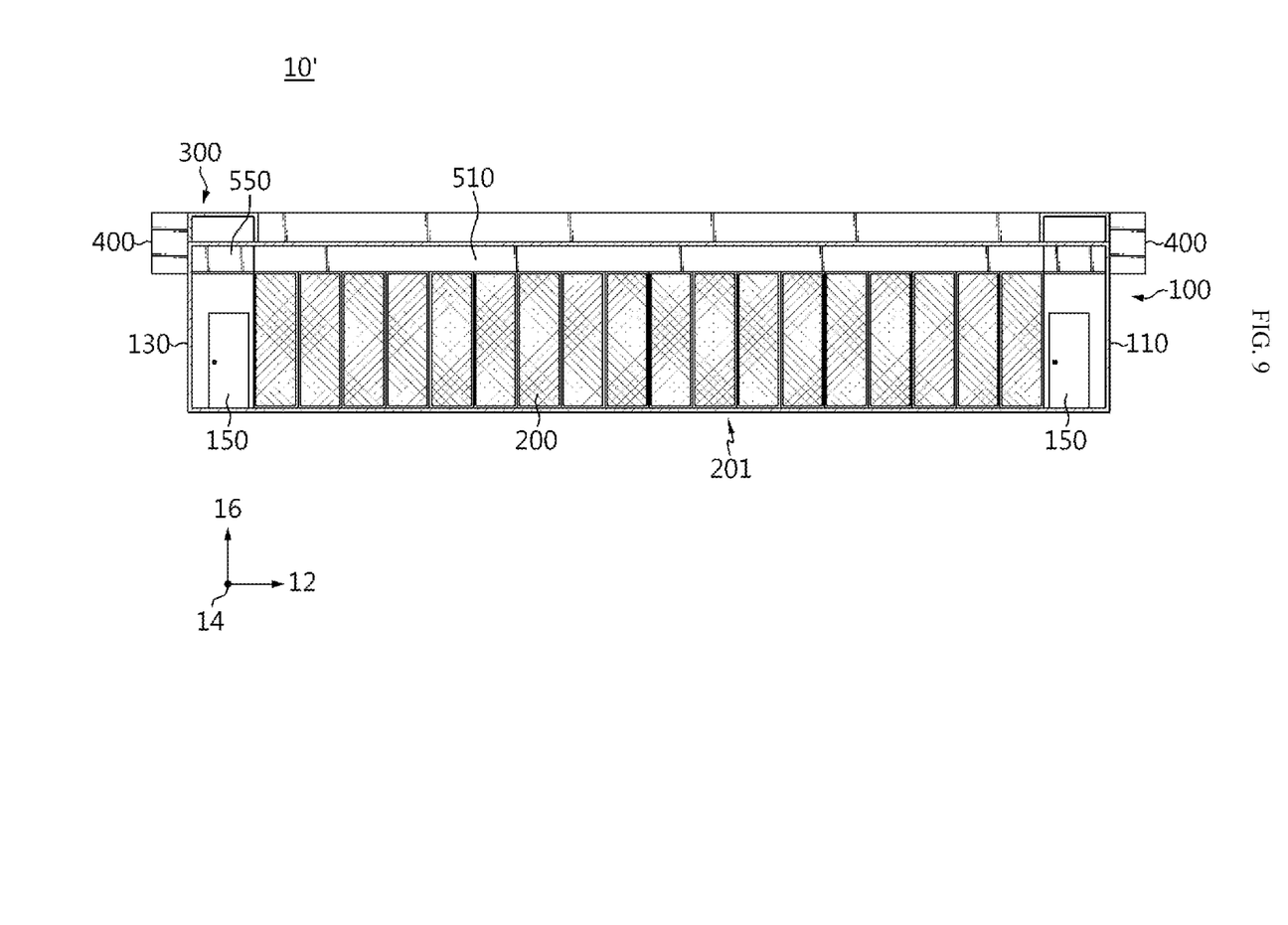
FIG. 9 is a vertical cross-sectional view of the ESS of FIG. 6, taken along a line C-C.

FIG. 7 is a vertical cross-sectional view of the ESS 10' of FIG. 6, taken along a line A-A, FIG. 8 is a vertical cross-sectional view of the ESS 10' of FIG. 6, taken along a line B-B, and FIG. 9 is a vertical cross-sectional view of the ESS 10' of FIG. 6, taken along a line C-C. Referring to FIGS. 5 to 9, the fluid channel members 500 provide the passage space 501 to move the cooling fluid used to cool the battery racks 200. In an embodiment of the present disclosure, for example, two fluid channel members 500 are provided in the container 100. The two fluid channel members 500 are provided at different locations but have the same configuration. The following description is focused on the fluid channel member 500 located near the first battery rack group 201, as a representative example. The fluid channel member 500 includes a partition 510, blocking plates 530, and the inner ducts 550.

The partition 510 is located on the first battery rack group 201. The partition 510 is located between the top wall of the container 100 and the first battery rack group 201. The partition 510 prevents the cooling fluid supplied from the upper duct 300, from moving to a space between the first battery rack group 201 and the second side wall 120. The partition 510 has a length direction along the first direction 12. The partition 510 may be provided as a plate.

The blocking plates 530 block the space between the second side wall 120 and the first battery rack group 201. The blocking plates 530 are located between an outermost battery rack 200 of the first battery rack group 201 and the second side wall 120. A pair of blocking plates 530 are provided. The blocking plates 530 are located to face each other. The pair of blocking plates 530 are spaced apart from each other along the first direction 12. The blocking plates 530 may have the same height as the battery racks 200.

The cooling fluid may flow in the inner ducts 550. A pair of inner ducts 550 are provided. The pair of inner ducts 550 are spaced apart from each other along the first direction 12. The inner ducts 550 connect the passage space 501 between the second side wall 120 and the first battery rack group 201. The inner ducts 550 are located at a higher height compared to top surfaces of the doors 150. The inner ducts 550 are located on the blocking plates 530. Each inner duct 550 may have a rectangular cross-section. An end of the inner duct 550 is connected to the cooling unit 400, and the other end thereof is connected to the space between the second side wall 120 and the first battery rack group 201. The inner duct 550 provides a space where the cooling fluid passed through the battery racks 200 moves to the cooling unit 400.

The duct smoke detector 670 may also be mounted in the inner duct 550 or a connection part between the inner duct 550 and the cooling unit 400.

As described above, the fluid channel member 500 provides the passage space 501 separate from the cooling space 102, using the partition 510, the blocking plates 530, and the inner ducts 550. The passage space 501 is a space where the cooling fluid moves to the cooling units 400 after the cold cooling fluid supplied to the cooling space 102 passes through the battery racks 200 to cool the battery racks 200. The cooling fluid may pass through each of battery modules stacked on one another and through spaces between the battery modules, to cool the battery racks 200. When viewed from a center of the cooling space 102 toward the second side wall 120, the passage space 501 has a T shape. The passage space 501 is separate from the cooling space 102 and may allow the cooling fluid heated after passing through the battery racks 200, to move without being mixed with the cooling fluid of the cooling space 102, thereby increasing efficiency of cooling the battery racks 200.

The flow of the cooling fluid in the ESS 10' of FIG. 3 will now be described. In FIGS. 6 and 7, arrows schematically indicate directions in which the cooling fluid flows. Referring to FIGS. 6 and 7, initially, the cooling fluid moves from the cooling units 400 to the upper duct 300. The cooling fluid moves to the upper duct 300 through the cooling units 400 located on the first or third side wall 110 or 130. The cooling fluid moves from the first horizontal part 310 to the center part 350, or from the second horizontal part 330 to the center part 350. While moving to the center part 350, the cooling fluid moves to the cooling space 102 through the suppliers 370 provided on the bottom surface of the center part 350. The cooling fluid moved to the cooling space 102 passes through the battery modules by the cooling fans of the battery racks 200. The cooling fluid cools the battery modules while passing through the battery modules. For example, the cooling fluid may pass through each of the battery modules stacked on one another and through spaces between the battery modules, to cool the battery racks 200. The cooling fluid passed through the battery modules moves to the cooling units 400 through the passage space 501 separate from the cooling space 102. The heated cooling fluid moved to the cooling units 400 is cooled and supplied to the upper duct 300 again.

In the conventional technology described above in relation to FIGS. 1 and 2, heat is generated when the cooling fluid used to cool the battery racks 3 is cooled by the internal cooling member 4. The heat increases an internal temperature of the container 2. As such, efficiency of cooling the battery racks 3 is reduced. In addition, due to a large capacity of the cooling member 4, an area occupied by the cooling member 4 in the container 2 is increased. On the other hand, in the above-described ESS 10' of the present disclosure, the battery racks 200 may be cooled by circulating the cooling fluid through the cooling units 400, the upper duct 300, the cooling space 102, the battery modules, the passage space 501, and then the cooling units 400. In this process, since the cooling space 102 is separate from the passage space 501 through which the heated cooling fluid moves, efficiency of cooling the battery racks 200 may be increased.

In the conventional technology described above in relation to FIGS. 1 and 2, since only the smoke detector 7 is used to determine whether a fire occurs, smoke unrelated to a fire may be recognized as a fire to incorrectly operate the fire extinguisher 5. On the other hand, in the above-described ESS 10' of the present disclosure, since a serial combination of the smoke detectors 655a and 655b, the heat detectors 660a and 660b, and the flame detectors 665a and 665b, and the duct smoke detector 670 are used, reliability and accuracy of diagnosing a fire may be increased. The duct smoke detector 670 may be mounted in the upper duct 300, the fluid channel members 500, or connection parts between the fluid channel members 500 and the cooling units 400 to more accurately diagnose a fire in the container 100.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An energy storage system (ESS) comprising:
a container having an accommodation space therein;
a heating, ventilation and air conditioning (HVAC) system configured to condition internal air of the container, to adjust an internal temperature of the container, and to adjust air flowing into the container;
battery racks located in the accommodation space and comprising a first battery rack group and a second battery rack group spaced apart from each other to face each other with respect to a center of the accommodation space; and
a fire control system provided in the container,
wherein the fire control system comprises:
a fire extinguisher and a control panel located entirely within the accommodation space;
a plurality of smoke detectors, a plurality of heat detectors, and a plurality of flame detectors mounted in the container; and
a duct smoke detector, and
wherein the control panel has:
a first mode for operating the fire extinguisher when all of the smoke detector, the heat detector, and the flame detector detect a fire;
a second mode for operating the fire extinguisher when the duct smoke detector detects a fire; and
a third mode for operating the fire extinguisher when a manipulation button is operated,
wherein the HVAC system comprises:
an upper duct located on the accommodation space to supply a cooling fluid to a cooling space between the first battery rack group and second battery rack group;
at least one cooling unit located outside the container to cool the cooling fluid and fluidly connected to the upper duct, wherein each cooling unit is an air conditioner; and
a fluid channel member having a passage space where the cooling fluid that is heated after cooling the battery racks flows to each cooling unit, wherein the upper duct overlaps the entirety of the fluid channel member and the upper duct is above the fluid channel member, and
wherein each cooling unit cools the heated cooling fluid received from the passage space, and then supplies cooled cooling fluid to the upper duct.

2. The ESS of claim 1, wherein the fire extinguisher is a valve-type extinguishing gas sprayer.

3. The ESS of claim 1, wherein the duct smoke detector is mounted in at least one of an inlet duct and an outlet duct of the HVAC system.

4. The ESS of claim 1, wherein the accommodation space is divided into a first region and a second region, and
wherein one of the smoke detectors, one of the heat detectors and one of the flame detectors are mounted in the first region and the second region.

5. The ESS of claim 4, wherein each smoke detector and each heat detector are mounted on a top wall of the container corresponding to a center part of the respective one of the first region and the second region, and
wherein each flame detector is mounted on the top wall of the container.

6. The ESS of claim 4, wherein the control panel operates the fire extinguisher when at least one the plurality of smoke detectors, at least one of the plurality of heat detectors and one of the plurality of flame detectors mounted in either a same region or a different region among the first region and the second region, detect a fire.

7. The ESS of claim 4, wherein the control panel does not operate the fire extinguisher but issues a fire alarm when all of the same type of the detectors among the plurality of smoke detectors, the plurality of heat detectors and the plurality of flame detectors mounted in different regions detect a fire.

8. The ESS of claim 1,
wherein the duct smoke detector is mounted in at least one of the upper duct and the fluid channel member.

9. The ESS of claim 1, wherein the container comprises:
a first side wall;
a second side wall located perpendicular to the first side wall;
a third side wall facing the first side wall and located perpendicular to the second side wall; and
a fourth side wall facing the second side wall and located perpendicular to the first and third side walls, and
wherein the at least one cooling unit is provided outside the first and third side walls.

10. The ESS of claim 1,
wherein the fluid channel member comprises:
a partition located on the first and second battery rack groups;
a pair of blocking plates configured to block a space between an outermost battery rack of the first or second battery rack group and the second or fourth side wall; and
a pair of inner ducts configured to provide the passage space between each cooling unit and the second side wall or between the second side wall and the first or second battery rack group, and
wherein the duct smoke detector is mounted in the inner ducts.

11. The ESS of claim 9, wherein the upper duct comprises:
a first horizontal part overlapping the first side wall;
a second horizontal part overlapping the third side wall and parallel to the first horizontal part; and
a center part attaching the first horizontal part to the second horizontal part and extending in a direction perpendicular to a direction of the first horizontal part and the second horizontal part, and
wherein the duct smoke detector is mounted in the center part.

12. The ESS of claim 11, wherein the battery racks of the first battery rack group are spaced apart from the second side wall by a first predetermined distance and aligned along a first direction, and the battery racks of the second battery rack group are spaced apart from the fourth side wall by a second predetermined distance and aligned along the first direction,
wherein the upper duct comprises a supplier configured to supply the cooling fluid into the accommodation space, the supplier being located on the center part,
wherein the supplier comprises:
an opening through which the cooling fluid flowing in the upper duct passes;
a plurality of guide plates aligned in a center region of the opening, spaced apart from each other along the first direction, and provided in a rotatable form; and
a guide plate controller configured to control the guide plates, and
wherein the duct smoke detector is mounted on the supplier.

13. A fire control method of an energy storage system (ESS) comprising a container having an accommodation space therein, a heating, ventilation and air conditioning (HVAC) system configured to condition internal air of the container, to adjust an internal temperature of the container and to adjust air flowing into the container, battery ranks located in the accommodation space and comprising a first battery rack group and a second battery rack group spaced apart from each other to face each other with respect to a center of the accommodation space, and a fire extinguisher, the method comprising:
mounting a plurality of smoke detectors, a plurality of heat detectors and a plurality of flame detectors in the container;
mounting a duct smoke detector in a duct of the HVAC system;
a first mode of operating the fire extinguisher when all of the smoke detector, the heat detector, and the flame detector detect a fire;
a second mode of operating the fire extinguisher when the duct smoke detector detects a fire; and
a third mode of operating the fire extinguisher when a manipulation button is operated, wherein the HVAC system further comprises:
an upper duct located on the accommodation space to supply a cooling fluid to a cooling space between the first and second battery rack groups;
at least one cooling unit located outside the container to cool the cooling fluid and fluidly connected to the upper duct, wherein each cooling unit is an air conditioner; and
a fluid channel member having a passage space where the cooling fluid heated after cooling the battery racks moves to each cooling unit, wherein the upper duct overlaps the entirety of the fluid channel member and the upper duct is above the fluid channel member, and
wherein each cooling unit cools the heated cooling fluid received from the passage space, and then supplies cooled cooling fluid to the upper duct.

14. The fire control method of claim 13, wherein the accommodation space is divided into a first region and a second region, and
wherein one of the smoke detectors one of the heat detectors and one of the flame detectors are mounted in each of the first region and the second region.

15. The fire control method of claim 14, wherein the fire extinguisher is operated when at least one the plurality of smoke detectors, at least one of the plurality of heat detectors and one of the plurality of flame detectors mounted in either a same region or a different region among the first region and the second region detect a fire.

16. The fire control method of claim 14, wherein the fire extinguisher is not operated but a fire alarm is issued when all of the same type of the detectors among the smoke detectors, the heat detectors, and the flame detectors mounted in different regions detect a fire.

* * * * *